US011659785B2

(12) United States Patent
Seiders, Jr.

(10) Patent No.: US 11,659,785 B2
(45) Date of Patent: May 30, 2023

(54) METHOD AND SYSTEM FOR CONTROLLING THE HEIGHT OF AN AGRICULTURAL IMPLEMENT RELATIVE TO THE GROUND

(71) Applicant: CNH Industrial America LLC, New Holland, PA (US)

(72) Inventor: Kenneth Seiders, Jr., Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 731 days.

(21) Appl. No.: 16/661,002

(22) Filed: Oct. 23, 2019

(65) Prior Publication Data

US 2021/0120725 A1 Apr. 29, 2021

(51) Int. Cl.
*A01D 41/14* (2006.01)
*A01D 75/28* (2006.01)
*A01B 63/00* (2006.01)
*A01D 45/00* (2018.01)

(52) U.S. Cl.
CPC .......... *A01D 41/141* (2013.01); *A01B 63/008* (2013.01); *A01D 75/287* (2013.01); *A01D 45/00* (2013.01)

(58) Field of Classification Search
CPC .. A01D 41/127; A01D 41/141; A01D 41/142; A01D 41/145; A01D 45/00; A01D 41/14; A01D 72/28; A01D 75/287; G05D 2201/0201; A01B 63/008; A01B 79/005
See application file for complete search history.

(56) References Cited

U.S. PATENT DOCUMENTS 5,155,984 A * 10/1992 Sheehan .............. A01D 41/141 56/DIG. 15
5,359,836 A * 11/1994 Zeuner ................. A01D 41/141 56/208
5,535,577 A * 7/1996 Chmielewski ....... A01D 75/287 56/208

(Continued)

FOREIGN PATENT DOCUMENTS

EP 1709859 A1 * 10/2006 ............. A01D 34/54
EP 2517543 A2 10/2012

(Continued)

OTHER PUBLICATIONS

EPO machine translation of EP 3289847 A1 (original EP document published Mar. 7, 2018) (Year: 2018).*

(Continued)

*Primary Examiner* — David A Testardi
(74) *Attorney, Agent, or Firm* — Peter Zacharias

(57) ABSTRACT

In one aspect, a method for automatically controlling a height of an implement of an agricultural work vehicle relative to a ground surface may include monitoring the height of the implement relative to the ground surface; determining a proportional signal by comparing the height of the implement with a predetermined target height; detecting a local inclination of the ground surface; calculating a derivative signal based on the local inclination of the ground surface; and adjusting the height of the implement relative to the ground surface based on an output signal that includes the proportional signal and the derivative signal.

20 Claims, 5 Drawing Sheets

(56) References Cited

U.S. PATENT DOCUMENTS

| | | | | |
|---|---|---|---|---|
| 5,704,200 | A * | 1/1998 | Chmielewski, Jr. | .......................... A01D 41/141 56/DIG. 15 |
| 6,073,070 | A * | 6/2000 | Diekhans | ............. A01D 75/287 701/1 |
| 6,389,785 | B1 * | 5/2002 | Diekhans | ............. A01B 69/008 172/4.5 |
| 6,615,570 | B2 | 9/2003 | Beck et al. | |
| 6,791,488 | B2 | 9/2004 | Diekhans et al. | |
| 6,826,894 | B2 | 12/2004 | Thiemann et al. | |
| 9,510,508 | B2 | 12/2016 | Jung | |
| 11,375,663 | B2 * | 7/2022 | Rotole | ................. A01D 34/286 |
| 2003/0000193 | A1 * | 1/2003 | Beck | .................... A01D 41/141 56/10.2 E |
| 2003/0184747 | A1 * | 10/2003 | Diekhans | ............. A01D 41/127 342/123 |
| 2004/0006958 | A1 * | 1/2004 | Thiemann | ............ A01D 41/141 56/10.2 R |
| 2008/0177449 | A1 * | 7/2008 | Pickett | ................. A01D 41/141 701/50 |
| 2010/0212276 | A1 * | 8/2010 | Digman | ............... A01D 75/287 56/10.2 E |
| 2010/0287900 | A1 * | 11/2010 | Ringwald | ........... A01D 41/141 56/28 |
| 2011/0099962 | A1 * | 5/2011 | Goers | ................. A01D 41/141 56/10.4 |
| 2013/0345937 | A1 * | 12/2013 | Strelioff | ............... A01D 41/141 701/50 |
| 2014/0041351 | A1 * | 2/2014 | Bollin | ................. A01D 41/141 56/10.2 E |
| 2015/0240453 | A1 * | 8/2015 | Jaliwala | .................. G01S 19/14 701/50 |
| 2015/0305239 | A1 * | 10/2015 | Jung | ..................... A01D 41/141 701/50 |
| 2016/0106038 | A1 * | 4/2016 | Boyd | ................... A01D 34/006 56/10.2 J |
| 2017/0013777 | A1 * | 1/2017 | Posselius | ............. A01D 41/141 |
| 2017/0118915 | A1 * | 5/2017 | Middelberg | ........ A01D 41/1278 |
| 2017/0245434 | A1 * | 8/2017 | Jung | .................... A01B 63/008 |
| 2018/0070531 | A1 * | 3/2018 | Long | .................... A01D 41/127 |
| 2018/0098491 | A1 * | 4/2018 | Long | .................... A01D 41/127 |
| 2018/0271016 | A1 * | 9/2018 | Milano | ................. A01D 33/14 |
| 2018/0332768 | A1 * | 11/2018 | Isaac | ..................... A01D 57/02 |
| 2019/0059223 | A1 * | 2/2019 | Seiders, Jr. | .......... A01D 41/141 |
| 2019/0082598 | A1 * | 3/2019 | Seiders, Jr. | .......... A01D 41/141 |
| 2019/0124846 | A1 * | 5/2019 | Ramp | .................. A01D 75/285 |
| 2019/0230855 | A1 * | 8/2019 | Reed | .................... A01D 41/141 56/28 |
| 2020/0260638 | A1 * | 8/2020 | Rotole | ................. A01B 63/008 |

FOREIGN PATENT DOCUMENTS

| | | | | |
|---|---|---|---|---|
| EP | | 3289847 A1 * | 3/2018 | ........... A01B 59/043 |
| EP | | 3289847 A1 | 3/2018 | |
| JP | | 2004350540 A * | 12/2004 | |
| WO | | 2018213439 A1 | 11/2018 | |

OTHER PUBLICATIONS

Extended European Search Report for EP Application No. 20203573.9 dated Feb. 23, 2021 (seven pages).

* cited by examiner

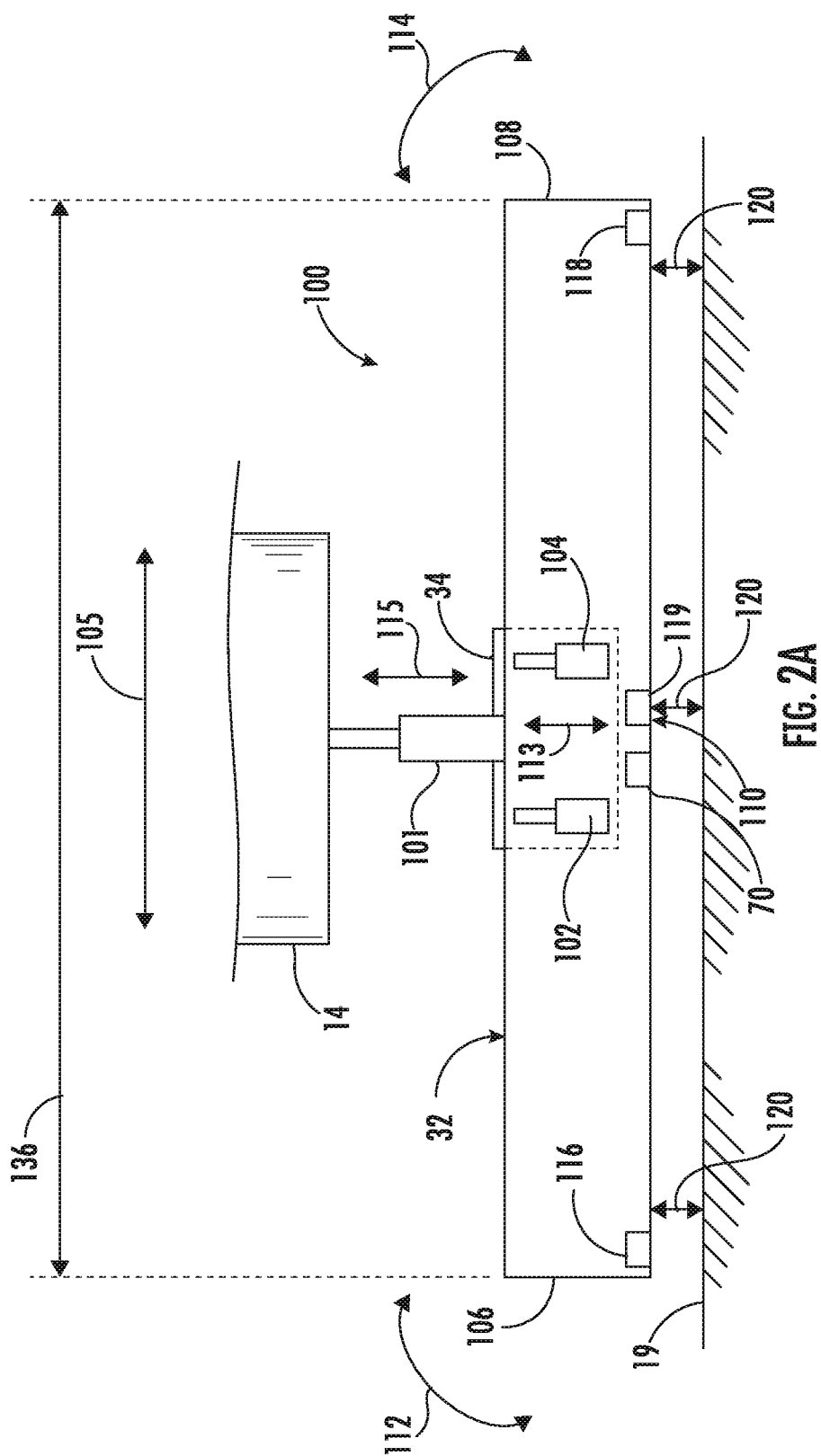

METHOD AND SYSTEM FOR CONTROLLING THE HEIGHT OF AN AGRICULTURAL IMPLEMENT RELATIVE TO THE GROUND

FIELD OF THE INVENTION

The present subject matter relates generally to height control systems for agricultural implements, and, more particularly, to a method and system for a controlling the height of an agricultural implement relative to a ground surface.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing.

Conventionally, the operation of most harvesters requires substantial operational involvement and control by the operator. For example, with reference to a combine, the operator is typically required to control various operating parameters, such as the direction of the combine, the speed of the combine, the height of the combine header, the air flow through the combine cleaning fan, the amount of harvested crop stored on the combine; and/or the like. To address such issues, many current combines utilize an automatic header height and tilt control system to maintain a constant cutting height above the ground regardless of the ground contour or ground position relative to the base combine. For instance, it is known to utilize electronically controlled height and tilt cylinders to automatically adjust the height and lateral orientation, or tilt, of the header relative to the ground based on sensor measurements. However, such systems often exhibit significant lag and slow response times, particularly when the harvester is operating at high ground speeds.

Accordingly, an improved method and related system for controlling the height of an agricultural implement relative to the ground that addresses one or more of the issues identified above would be welcomed in the technology.

BRIEF DESCRIPTION OF THE INVENTION

Aspects and advantages of the invention will be set forth in pail in the following description, or may be obvious from the description, or may be learned through practice of the invention.

In one aspect, the present subject matter is directed to a method for automatically controlling a height of an implement of an agricultural work vehicle relative to a around surface. The method may include monitoring the height of the implement relative to the ground surface; determining a proportional signal by comparing the height of the implement with a predetermined target height; detecting a local inclination of the ground surface; calculating a derivative signal based on the local inclination of the ground surface; and adjusting the height of the implement relative to the ground surface based on an output signal that includes the proportional signal and the derivative signal.

In another aspect, the present subject matter is directed to a height control system for an implement of an agricultural work vehicle. The control system may include an implement and an inclination sensor configured to detect a local inclination of the ground surface. A controller may be communicatively coupled to the inclination sensor. The controller can include a processor and associated memory. The memory can store instructions that, when executed by the processor, configure the controller to perform operations. The operations can include monitoring the height of the implement relative to the ground surface; determining a proportional signal by comparing the height of the implement with a predetermined target height; detecting a local inclination of the ground surface based on signals received from the inclination sensor; calculating a derivative signal based on the local inclination of the ground surface; and adjusting the height of the implement relative to the ground surface based on an output signal that comprises the proportional signal and the derivative signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2A illustrates a simplified, schematic view of one embodiment of a hydraulic system for an agricultural harvester in accordance with aspects of the present subject matter;

DETAILED DESCRIPTION OF THE INVENTION

Figure 1:
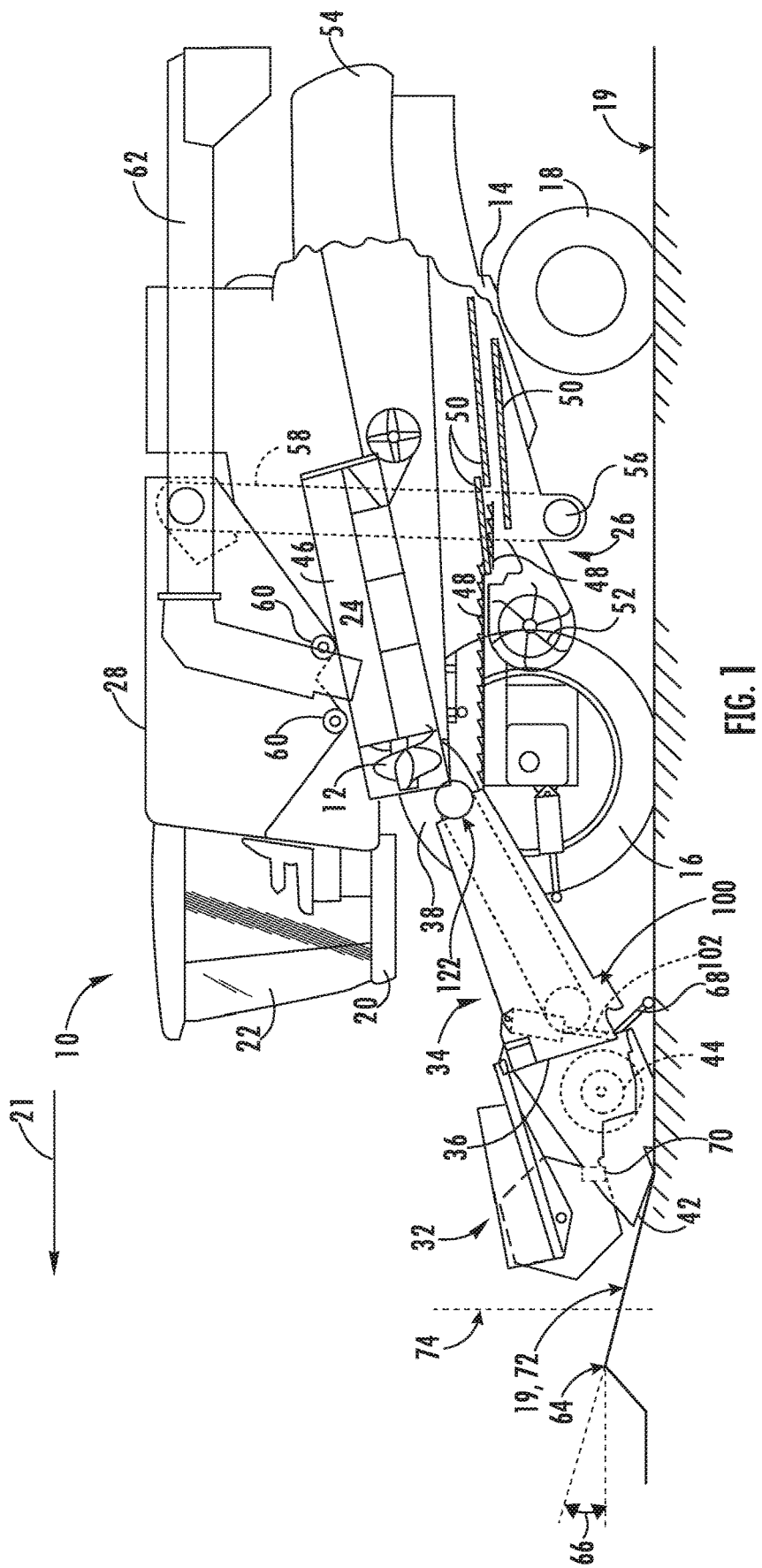
FIG. 1 illustrates a simplified, partial sectional side view of one embodiment of an agricultural vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

In general, the present subject matter is directed to a control system for controlling the height of an implement associated with an agricultural vehicle. For example, a proportional-derivative ("PD") or proportional-integral-derivative ("PID") control system may be used to monitor and control the height of the implement relative to a ground surface. A local inclination of the ground surface near and/or beneath the implement can be detected, for example using one or more inclination sensors. The inclination sensor(s) can be configured to measure multiple distances to distinct locations on the ground surface. The controller can be configured to calculate the local inclination based on the multiple distances.

The control system can adjust the height of the implement based on a proportional signal and a derivative signal (e.g., as a PD or PID controller). The derivative signal can be calculated based on the detected local inclination, which can provide multiple benefits as compared with prior art methods. For example, prior art methods can generally include calculating the derivative signal based on a comparison between a current measurement and a past measurement of the height of the implement. The resulting derivative signal, however, is necessarily retrospective and/or reactive (as opposed to prospective). More specifically, the past measurement of the height of the implement corresponds with a ground surface location that has now passed the height sensor. In other words, such calculations are based on comparing the current implement height with previously detected implement heights.

The present disclosure, in contrast, provides for calculating the derivative signal based on a current local inclination of the ground surface. The local inclination can be determined based on signals received from one or more inclination sensors that are configured to sense the local inclination of the ground surface. For example, the local inclination can be sensed at a portion of the ground surface that is at least partially forward of a location at which the implement height is detected and/or aft of a leading edge of the implement. The local inclination can be detected for a portion of the ground surface that is at least partially beneath the implement. Thus, the derivative signal can be indicative of current, anticipated, and/or imminent changes in implement height, in contrast with a retroactive derivative signal as described above, which can be descriptive of past changes in implement height.

A PD or PID loop employing a derivative signal calculated based on the local inclination as described herein can provide improved system response. For example, the system can anticipate upcoming variations in the ground surface and thus provide smoother (e.g., reduced jitter or jerk) and/or more accurate control of the implement height.

Although the disclosed systems and methods will be described primarily with references to harvesters, they may be applicable to any suitable agricultural vehicles having implements which would benefit from improved height control.

Referring now to the drawings, FIG. 1 illustrates a simplified, partial sectional side view of one embodiment of a work vehicle, a harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of travel 21 relative to the ground surface 19. Additionally, an operator's platform 20 with an operator's cab 22, a threshing and separating assembly 24, a grain cleaning assembly 26 and a holding tank 28 supported by the frame 14. Additionally, as is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed, or the like, is loosened and separated from the straw.

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 100 which is configured to adjust a height of the header 32 relative to the around 19 so as to maintain the desired cutting height between the header 32 and the ground 19. The hydraulic system 100 may include a height control cylinder 101 configured to adjust the height of the header 32 relative to the ground. For example, in some embodiments, the height control cylinder 101 may be coupled. between the feeder 34 and the frame 14 such that the second height control cylinder 101 may pivot the feeder 34 to raise the header 32 relative to the ground 19. In some embodiments, hydraulic system 100 may include first and second tilt cylinders 102, 104 coupled between the header 32 and the feeder 34 to allow the header 32 to be tilted relative to the ground 19 or pivoted laterally or side-to-side relative to the feeder 34.

The header 32 may be raised and lowered by the hydraulic system 100 to the height of the header 32 as the header 32 passes over local surface variations 64, such as bumps, dips, and the like. A local inclination 66 of the ground surface 19 can be defined as an angle of the ground surface 19 with respect to the work vehicle 10. The local inclination 66 is distinct from the respective pitches of the header 32 and work vehicle 10 with respect to a horizontal direction (e.g., corresponding with the arrow illustrating the direction of travel 21). In contrast, a pitch of the header 32 can be defined as a relative orientation angle of the header 32 with respect to the horizontal direction e.g., illustrated by the direction of travel arrow 21). Similarly, a pitch of the work vehicle 10 can be defined as a relative orientation angle of the work vehicle 10 with respect to the horizontal direction (e.g., illustrated by the direction of travel arrow 21). The local inclination 66 can be indicative of imminent changes in the header height. These relative pitches, however, are not necessarily indicative of such imminent changes. One or more inclination sensors 70 can be configured to detect the local inclination, for example as described below with reference to FIG. 2B.

One or more height sensors can be configured to detect the height of the header 32. For example, one or more height sensors 68 can be configured to detect a height of the header 32 relative to the ground surface 19. The height sensor(s) 68 can be configured to contact the ground surface 19 and detect the height of the implement 34 based on deflections of the height sensor(s) 68. Additionally or alternatively, one or more of the height sensor(s) 68 can be configured to detect the height of the header 32 without physically contacting the ground surface 19. In some implementations multiple height sensors 68 can be spaced apart in a lateral direction that is perpendicular to the direction of travel 21 of the work vehicle 10, for example as described below with reference to the height sensors 116, 118, 119 of FIG. 2A. In other words, the height sensor(s) 68 of FIG. 1 may correspond with the height sensors 116, 118, 119 of FIG. 2A.

Referring now to FIG. 2A, a simplified, schematic view of one embodiment of the hydraulic system 100 described above with reference to FIG. 1 is illustrated in accordance with aspects of the present subject matter. As shown, the header 32 may generally extend side-to-side or in a lengthwise direction (indicated by arrow 105 in FIG. 2A) between a first lateral end 106 and a second lateral end 108. Additionally, the header 32 may be coupled to the feeder 34 at a location between its first and second lateral ends 106, 108 to allow the header 32 to tilt laterally relative to the feeder 34 (e.g., as indicated by arrows 112, 114 in FIG. 2A). For example, the header 32 may be coupled to the feeder 34 roughly at a center 110 of the header 32. The height control cylinder 101 may be configured to raise and lower the end of the feeder 34 relative to the frame 14 of the harvester (e.g., as indicated by arrow 115). The lateral tilt cylinders 102, 104 may be configured to laterally tilt the header 32 relative to the ground 19 (e.g., as indicated by arrows 112, 114). In some embodiments, the tilt cylinders 102, 104 may also be configured to raise and lower the header 32 with respect to the feeder 34 (e.g., as indicated by arrow 113).

As indicated above, the hydraulic system 100 may include the height control cylinder 101 and one or more tilt cylinders 102, 104. For instance, as shown in the illustrated embodiment, the first tilt cylinder 102 may be coupled between the header 32 and the feeder 34 along one lateral side of the connection between the header 32 and the feeder 34, and a second tilt cylinder 104 may be coupled between the header 32 and the feeder 34 along the opposed lateral side of the connection between the header 32 and the feeder 34. In general, the operation of the height control cylinder 101 and tilt cylinders 102, 104 may be controlled (e.g., via an associated controller) to adjust the height and angle of the header 32 relative to the ground 19. For instance, one or more height sensors 116, 118, 119 (e.g., corresponding with the height sensor(s) 68 described above with reference to FIG. 1) may be provided on the header 32 to monitor one or more respective local distances or heights 120 defined between the header 32 and the ground 19. The height sensors 116, 118, 119 may be configured to contact the ground surface 19, for example as illustrated for the height sensor(s) 68 of FIG. 1.

As shown in FIG. 2A, a first height sensor 116 may be provided at or adjacent to the first lateral end 106 of the header 32, and a second height sensor 118 may be provided at or adjacent to the second lateral end 108 of the header 32. In some embodiments, a third height sensor 119 may be provided at or adjacent the center 110 of the header 32. In such an embodiment, when one of the height sensors 116, 118, 119 detects that the local height 120 defined between the header 32 and the ground 19 differs from a desired height (or falls outside a desired height range), the height control cylinder 101 and/or the tilt cylinders 102, 104 may be actively controlled so as to adjust the height and/or tilt of the header 33 in a manner that maintains the header 32 at the desired height (or within the desired height range) relative to the ground 19. In some embodiments, the desired height may be an average, weighted average, or other suitable mathematical combination of the local heights 120 measured by one or more of the height sensors 116, 118, 119.

Figure 2B:
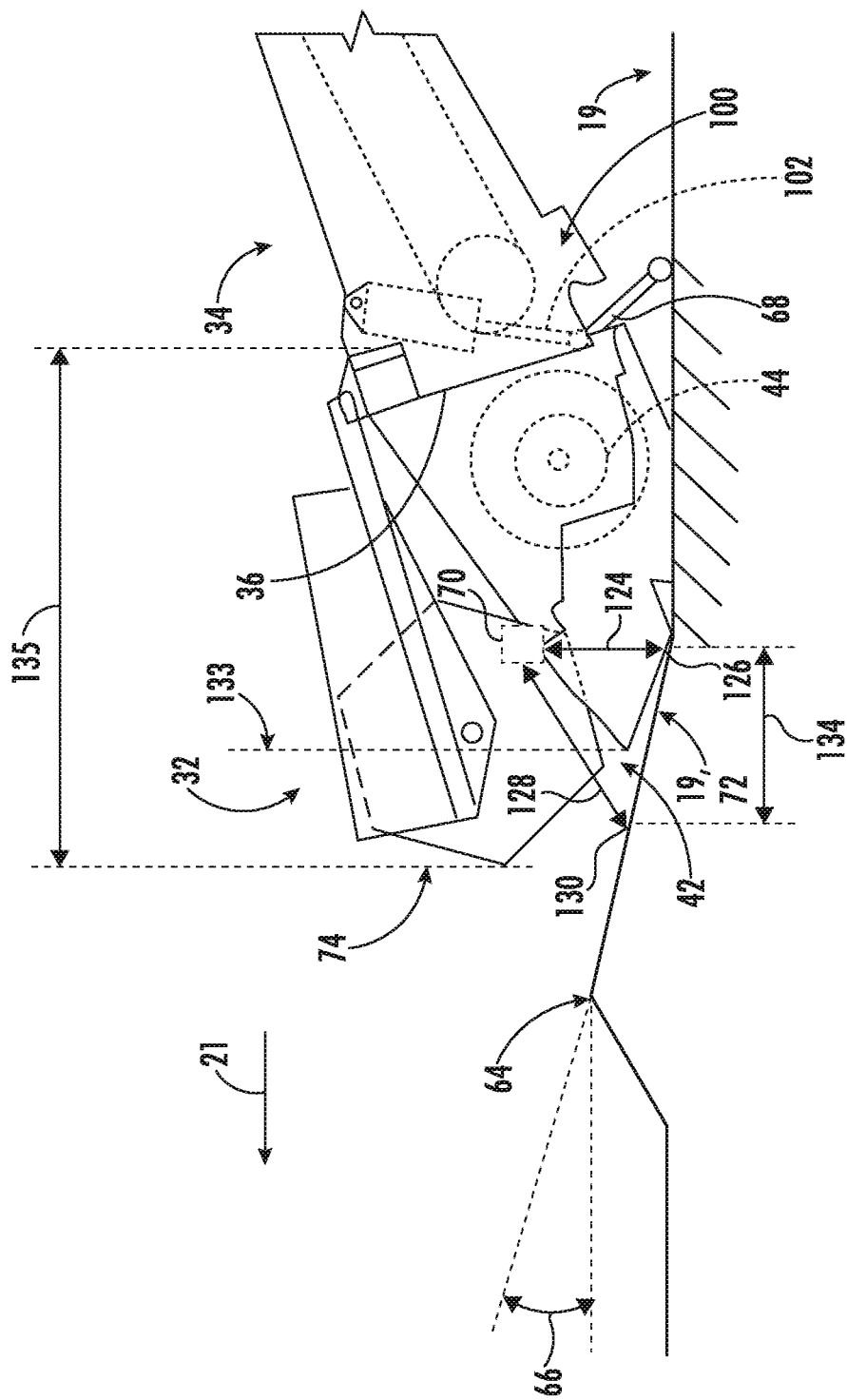
FIG. 2B depicts an enlarged portion of the simplified, partial sectional side view of the agricultural vehicle of FIG. 1 in accordance with aspects of the present subject matter.

FIG. 2B depicts an enlarged portion of the simplified, partial sectional side view of the agricultural vehicle of FIG. 1 in accordance with aspects of the present subject matter. One or more inclination sensors 70 can be configured to determine the local inclination 66 (FIG. 1) of the ground surface 19 proximate the header 32. As indicated above, the local inclination 66 of the ground surface 19 can be defined as an angle of the ground surface 19 with respect to the work vehicle 10.

The inclination sensor(s) 70 can include a variety of sensor types and configurations. For example, the inclination sensor(s) 70 can include an electric eye sensor, infrared, ultrasonic, radar, laser, maser (microwave amplification by stimulated emission of radiation), or any other suitable type of optical or non-optical distance and/or proximity sensors.

The inclination sensor(s) 70 can be configured to sense the local inclination 66 of the ground surface 19 in a variety of ways and at a variety of locations. The inclination sensor(s) 70 can be coupled to the header 32, feeder 34, work vehicle 10, and/or one or more components that are coupled to one or more of the above. For example, referring to FIG. 2B, the inclination sensor(s) 70 can be coupled to the header 32.

The local inclination 66 can be indicative of current or imminent changes in the implement height. For example, the local inclination 66 can be detected for a portion 72 of the ground surface 19 that is at least partially located beneath the implement (e.g., header 33). The portion 72 of the ground surface where the local inclination 66 is detected can be relatively small and/or located proximate the header 32 such that the local inclination 66 is indicative of current, anticipated, and/or imminent changes in implement height.

For example, the portion 72 of the ground surface 19 can be aft of a leading edge 74 of the implement 32 with respect to the direction of travel 21. The portion 72 of the ground surface 19 can be located forward of the height sensor(s) 68 (e.g., corresponding with the height sensors 116, 118, 119 of FIG. 2A) and/or a pivot location 122 at which the feeder 34 can be pivotally coupled to the main frame 14. Thus, the local inclination 66 of the portion 72 of the ground surface 19 can be indicative of current, anticipated, and/or imminent changes in the height of the implement height 32.

For example, referring to FIG. 2B, the inclination sensor(s) 70 can be configured to sense a first distance 124 between the inclination sensor(s) 70 and a first location 126 of the ground surface 19. The inclination sensor(s) 70 can be configured to sense a second distance 128 between the inclination sensor(s) 70 and a second location 130 of the ground surface 19. The second location 130 can be spaced apart from the first location 126 in the direction of travel 21.

The first location 126 and second location 130 can be selected such that the portion 72 of the ground surface where the local inclination 66 is detected is relatively small and/or proximate the header 32. For example, the first location 126 can be aft of a leading edge 132 of the header 33 with respect to the direction of travel 21. The leading edge 132 can correspond with the most forward point of the implement 32. The second location 130 can be located forward of the first location 126 with respect the direction of travel 21. In some implementations, the first location 126 can be aligned with the second location 130 in a lateral direction (e.g., arrow 105 in FIG. 2A) that is perpendicular to the direction of travel 21 of the agricultural work vehicle 10. The first location 126 can be forward of a cutting edge 133 (FIG. 2B) at which the implement 34 is configured to cut crop (e.g., by the sickle bar 42).

The second location 130 can be spaced apart from the first location 126 in the direction of travel 21 by a distance 134. The distance 134 can be less than a depth 135 of the header 32 in the direction of travel 21. In some embodiments, the distance 134 can be less than 50% of the depth 135 of the header 32, in some embodiments less than 25% of the depth 135 of the header 32, and in some embodiments less than 15% of the depth 135 of the header 32. In some embodiments, the distance 134 can be less than half of a width 136 (FIG. 2A) of the implement (e.g., header 33) in the lateral direction 155 that is perpendicular to the direction of travel 21. In some embodiments, the distance 134 can be less than one quarter of the width 136 and in some embodiments less than 15% of the width 136. Thus, the local inclination 66 of the ground surface 19 can be detected for the portion 72 of the ground surface 19 that is located below at least a portion of the implement (e.g., header 33). As such, a derivative signal that is calculated based on the local inclination 66 can be indicative of current, anticipated, and/or imminent changes in implement height.

In some embodiments, a single inclination sensor 70 can be configured to detect the local inclination 66. The single inclination sensor 70 can be configured to detect the first distance 124 and second distance 128 relative to a location of the single inclination sensor 70. As such that first distance 128 and second distance 124 can be measured relative to a location that is approximately aligned in a longitudinal direction of the work vehicle 10 (e.g., illustrated by the direction of travel 21).

In other embodiments, multiple inclination sensors 70 can be configured to detect the local inclination 66. The multiple inclination sensors 70 can generally be aligned in the direction of travel 21 such that the first and second distances 124, 128 are measured to a common longitudinal reference location (e.g., at the inclination sensor(s) 70 illustrated in FIG. 2B). However, the inclination sensors 70 can be spaced apart in a lengthwise direction 105 and/or spaced apart in the direction of travel 21 can configured to detect respective distances (e.g., a first distance, a second distance, and so forth) between each respective inclination sensor 70 and different locations on the ground surface 19. The local inclination 66 can be detected based on the various respective distances. For instance, in one embodiment the inclination sensors 70 can be configured to detect respective vertical distances to the ground surface 19 (e.g., local heights). The relative locations at which the inclination sensors 70 are coupled to the header 32, feeder 34, or other suitable can be known. Thus, the respective distances between the multiple inclination sensors 70 and distinct locations on the ground surface 19 can be used to determine the local inclination 66.

Figure 3:
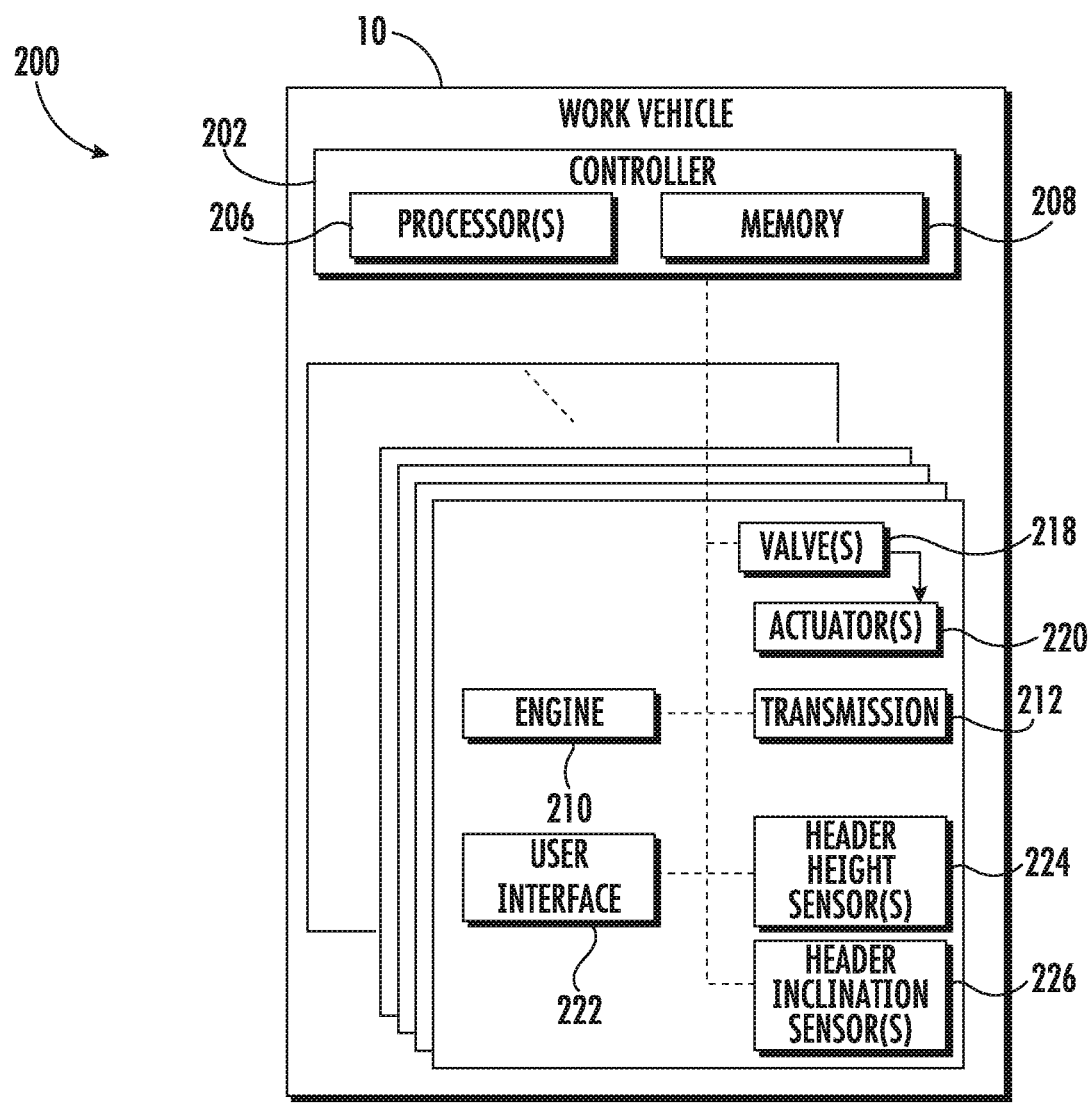
FIG. 3 illustrates a schematic view of one embodiment of a system for controlling the height of an agricultural implement relative to the ground in accordance with aspects of the present subject matter.

Referring now to FIG. 3, a schematic view of one embodiment of a control system 200 is provided for automatically controlling the height of an agricultural implement (such as the header 32 of the harvester 10 described above) relative to the ground 19 in accordance with aspects of the present subject matter. In general, the control system 200 will be described herein with reference to the harvester 10 and header 32 illustrated in FIG. 1. However, it should be appreciated that the disclosed control system 200 may be implemented to control the height of any suitable agricultural implement associated with a work vehicle having any other suitable configuration.

As shown, the control system 200 may generally include a controller 202 installed on and/or otherwise provided in operative association with the harvester 10. In general, the controller 202 of the disclosed system 200 may correspond to any suitable processor-based device(s), such as a computing device or any combination of computing devices. Thus, in several embodiments, the controller 202 may include one or more processor(s) 206 and associated memory device(s) 208 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 of the controller 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206 configure the controller 202 to perform various computer-implemented functions, such as one or more aspects of a method 300 for controlling the height of the implement described below with reference to FIG. 4.

In addition, the controller 202 may also include various other suitable components, such as a communications circuit or module, a network interface, one or more input/output channels, a data/control bus and/or the like, to allow the controller 202 to be communicatively coupled with any of the various other system components described herein. In some embodiments, the controller 202 may be configured to monitor and/or control the engine 210 and transmission 212 of the harvester 10.

Referring still to FIG. 3, the controller 202 may generally be configured to control the operation of one or more components of the harvester 10. For instance, in several embodiments, the controller 202 may be configured to control the operation of one or more components that regulate the height of the header 32 relative to the ground 19. For example, the controller 202 may be communicatively coupled to one or more control valve(s) 218 configured to regulate the supply of fluid (e.g., hydraulic fluid or air) to one or more corresponding actuator(s) 220. In some embodiments, the actuators 220 may correspond to the height control cylinder 101, first tilt cylinder 102, and/or second tilt cylinder 104. The control valve(s) 218 may correspond to one or more valves associated with the cylinder(s) 101, 102, 104.

Moreover, as shown in the illustrated embodiment, the vehicle controller 202 may be communicatively coupled to a user interface 222 of the work vehicle 10. In general, the user interface 222 may correspond to any suitable input device(s) configured to allow the operator to provide operator inputs to the vehicle controller 202, such as a touch screen display, a keyboard, joystick, buttons, knobs, switches, and/or combinations thereof located within the cab 22 of the work vehicle 10. The operator may provide various inputs into the system 200 via the user interface 222. In one embodiment, suitable operator inputs may include, but are not limited to a target height for the implement, a crop type and/or characteristic indicative of a suitable target header height, and/or any other parameter associated with controlling the height of the implement.

Additionally, the controller 202 may also be communicatively coupled to the various sensors associated the header 32. For instance, as shown in FIG. 3, the controller 202 may be coupled to one or more header height sensor(s) 224 configured to monitor the height of the header 32 relative to the ground 19. In one embodiment, the header height sensor(s) 224 may correspond to one or more of the height sensor(s) 68 described above with reference to FIG. 2B and the height sensor(s) 116, 118, 119 described above with reference to FIG. 2A.

The controller 202 can be communicatively coupled to one or more header inclination sensor(s) 226, for example as described above with respect to the inclination sensor(s) 70 described above with reference to FIG. 2B.

Figure 4:
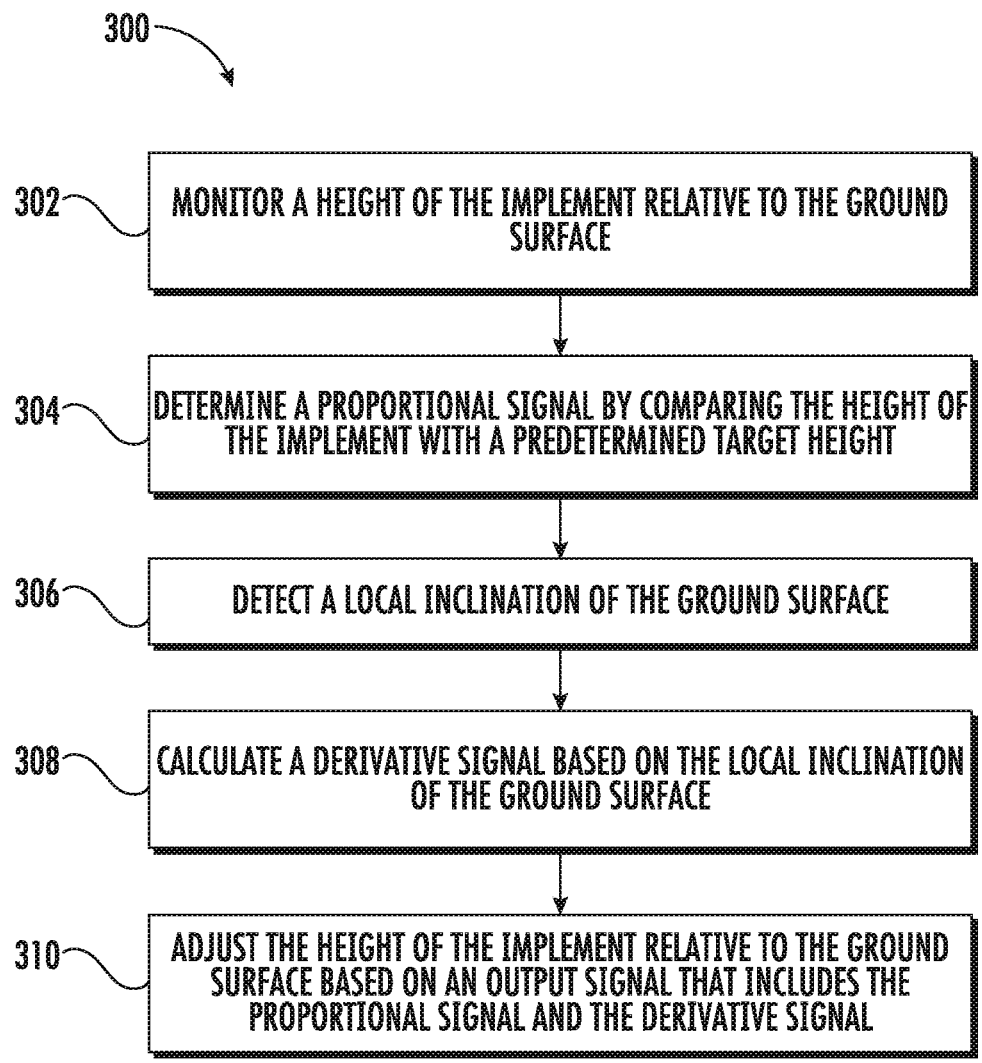
FIG. 4 illustrates a flow diagram showing one embodiment of a method for controlling the height of an agricultural implement relative to the ground in accordance with aspects of the present subject matter.

FIG. 4 illustrates a flow diagram of one embodiment of a method 300 for automatically controlling a height of an implement of an agricultural work vehicle relative to a ground surface in accordance with aspects of the present subject matter. Although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, the method 300 may be described herein with reference to the harvester 10 and header 32 shown in FIG. 1. However, it should be appreciated that the disclosed method 300 may be implemented to control the height of any suitable agricultural implement associated with a work vehicle having any other suitable configuration.

Referring to FIG. 4, the method 300 may include, at (302), monitoring a height of the implement (e.g., header 32) relative to the ground surface 19. For example, the controller may receive signals from the header height sensor(s) 224 (e.g., height sensor(s) 68, 116, 118, 119 configured to monitor local distance(s) or height(s) 120 defined between the header 32 and the ground 19). The controller 202 may be configured to receive signals from the height sensor 224 and convert the signals into a measurement.

The method 300 may include, at (304), determining a proportional signal by comparing the height of the implement with a predetermined target height. For example, in one embodiment, the controller 202 may be configured as a proportional-derivative (PD) controller or a proportional-integral-derivative (PID) controller. The following equation shows the output signal, u(t), of a PID controller in accordance with aspects of the present disclosure, where e(t) represents the implement height error as a function of time, t; $K_p$ and $K_i$ represent respective constant gains for each of the proportional and integral signal components; and D represents the derivative signal:

$$u(t)=K_p e(t)+K_i \int e(t)dt+D \quad (1)$$

The implement height error can be determined by comparing the height of the implement with a predetermined target height. The controller 202 may subtract the predetermined target height from the monitored height to determine the implement height error. Thus, when the monitored height exceeds the predetermined target height, the implement height error may be positive. When the predetermined target height exceeds the monitored height, the implement height error may be negative.

In some embodiments, the predetermined target height may be based on the specific model of the header 32 and/or may be input by the operator through the user interface 222. For example, as indicated above, the operator may directly input a desired target height or may input crop information or characteristics, such as the type, condition, height, density, and/or the like of the crop, from which the controller may select an appropriate target height using the user interface 222.

The method 300 may include, at (306), detecting the local inclination 66 of the ground surface 19. The controller 202 can be configured to detect the local inclination 66 based on signals received from the inclination sensor(s) 70. The local inclination 66 can be detected for a portion 72 of the ground surface 19 is proximate the implement 32. For example, the portion 72 of the ground surface 19 can be at least partially below the implement 32, aft of the leading edge 74 of the implement 32, forward of the pivot 122 between the feeder 34 and main frame 14, and so forth, for example as described with respect to FIG. 2B.

The method 300 may include, at (308), calculating a derivative signal based on the local inclination 66 of the ground surface 19. The derivative signal can be proportional to the detected local inclination 66. For example, the derivative signal, D, can be equal to the detected local inclination 66, I, multiplied by a derivative gain, $K_d$, plus an offset, O.

$$D=K_d I+O \quad (2)$$

The offset, O, is generally zero such that the derivative signal, D, equals zero when the local inclination 66, I, equals zero. However, the offset, O, can be a suitable positive or negative number. The derivative gain, $K_d$, can be selected to provide the desired response of the system 200. In some embodiments, the derivative gain, $K_d$, can equal one such. As such, the derivative signal, D, can equal the local inclination 66 (e.g., in radians or degrees). It should be understood the derivative signal can be proportional to the local inclination 66 in a variety of other suitable configurations. The local inclination 66 can be indicative of current, anticipated, and/or imminent changes in implement height.

The derivative signal and/or detected local inclination 66 can be subject to a variety of processing or conditioning. For example, the derivative signal and/or detected local inclination 66 can be "smoothed" and/or filtered to reduce jitter, jerk, and the like. Smoothing and/or filtering the derivative signal and/or detected local inclination 66 can be achieved with a variety of suitable techniques. Examples include moving average, low pass filter, and exponential smoothing. Any suitable method of smoothing and/or filtering can be employed, however. Thus, the derivative signal and/or detected local inclination 66 can be processed and/or conditioned.

The method 300 may include, at (310), adjusting the height of the implement 33 relative to the ground surface 19 based on the output signal, which can include the derivative signal (e.g., as described above with equation 1). The controller 202 may adjust one or more of the control valve(s) 218 to raise and lower the header 32 relative to the ground 19 using one or more of the actuator(s) 220, such as the height control cylinder 101 and/or the tilt cylinders 102, 104.

In some embodiments, the controller may be configured to adjust the angle of the implement relative to the ground to account for ground unevenness. For example, the controller may be configured to adjust the height of the 32 header based on the inputs from height sensor(s) 68, 116, 118, 119. As indicated above, in some embodiments, the tilt cylinders may be capable of adjusting the height of the header 32 of the harvester 10. For example, the controller 202 may be configured to adjust the local height 120 measured at the center 110 of the header 32, using the height control cylinder 101. Additionally, in some embodiments, the controller 202 may be configured to adjust the local height 120 of the header 32 at each end 106, 108 of the header 32 using the tilt cylinders 102, 104. Moreover, in some embodiments, the controller 202 may be configured to perform discrete or linked control loops for each of the local heights 120 of the header 32 using any suitable technique or combination of techniques described herein.

It is to be understood that, in several embodiments, the steps of the method 300 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, in several embodiments, any of the functionality performed by the controller 202 described herein, such as the method 300, are implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically controlling a height of an implement of an agricultural work vehicle relative to a ground surface, the method comprising:
    monitoring, with one or more computing devices, the height of the implement relative to the ground surface;
    determining, with the one or more computing devices, a proportional signal by comparing the height of the implement with a predetermined target height;
    detecting, with the one or more computing devices, a local inclination of the ground surface in a direction of travel of the agricultural work vehicle;
    calculating, with the one or more computing devices, a derivative signal based on the local inclination of the ground surface; and
    adjusting, with the one or more computing devices, the height of the implement relative to the ground surface based on an output signal of a PD or PID control loop calculated as a function of both the proportional signal and the derivative signal.

2. The method of claim 1, further comprising calculating an integral signal based on the height of the implement relative to the ground surface, and wherein the output signal further comprises the integral signal and is output from the PID control loop.

3. The method of claim 2, wherein detecting the local inclination of the ground surface comprises receiving signals from at least one inclination sensor.

4. The method of claim 3, wherein the at least one inclination sensor is coupled to at least one of the implement or a component coupled to the implement.

5. The method of claim 1, wherein detecting the local inclination of the ground surface comprises detecting the local inclination of a portion of the ground surface that is aft of a leading edge of the implement with respect to the direction of travel of the work vehicle.

6. The method of claim 1, wherein:
    monitoring the height of the implement relative to the ground surface comprises monitoring the height of the implement at a height monitoring location; and
    detecting the local inclination of the ground surface comprises detecting the local inclination of a portion of the ground surface that is forward of the height monitoring location and aft of a leading edge of the implement with respect to the direction of travel of the work vehicle.

7. The method of claim 1, wherein detecting the local inclination of the ground surface comprises:
   detecting a first distance between at least one inclination sensor and a first location on the ground surface;
   detecting a second distance between the at least one inclination sensor and a second location on the ground surface that is spaced apart from the first location in the direction of travel of the agricultural work vehicle; and
   calculating the local inclination based on the first distance and the second distance.

8. The method of claim 7, wherein each of the first location and second location is located aft of a leading edge of the implement with respect to the direction of travel.

9. The method of claim 7, wherein the second location is spaced apart from the first location in the direction of travel of the agricultural work vehicle by a distance that is less than half of a width of the implement in a lateral direction that is perpendicular to the direction of travel of the agricultural work vehicle.

10. The method of claim 1, wherein detecting the local inclination of the ground surface comprises detecting an inclination of a portion of the ground surface that is located below at least a portion of the implement.

11. The method of claim 1, wherein calculating the derivative signal based on the local inclination of the ground surface is free of calculating a rate of change of an implement height error.

12. A height control system for an implement of an agricultural work vehicle, the control system comprising:
   an implement;
   an inclination sensor configured to detect a local inclination of a ground surface;
   a controller communicatively coupled to the inclination sensor, the controller including a processor and associated memory, the memory storing instructions that, when executed by the processor, configure the controller to:
      monitor a height of the implement relative to the ground surface;
      determine a proportional signal by comparing the height of the implement with a predetermined target height;
      detect a local inclination of the ground surface in a direction of travel of the agricultural work vehicle based on signals received from the inclination sensor;
      calculate a derivative signal based on the local inclination of the ground surface; and
      adjust the height of the implement relative to the ground surface based on an output signal of a PD or PID control loop calculated as a function of both the proportional signal and the derivative signal.

13. The system of claim 12, wherein the controller is further configured to calculate an integral signal based on the height of the implement relative to the ground surface, and wherein the output signal further comprises the integral signal and is output from the PID control loop.

14. The system of claim 12, wherein the inclination sensor is coupled to at least one of the implement or a component coupled to the implement.

15. The system of claim 12, wherein detecting the local inclination of the ground surface comprises detecting the local inclination of a portion of the ground surface that is aft of a leading edge of the implement with respect to the direction of travel of the work vehicle.

16. The system of claim 12, wherein:
   the height of the implement relative to the ground surface is monitored at a height monitoring location; and
   the local inclination of the ground surface is detected for a portion of the ground surface that is forward of the height monitoring location and aft of a leading edge of the implement with respect to the direction of travel of the work vehicle.

17. The system of claim 12, wherein:
   the inclination sensor is configured to detect a first distance between the inclination sensor and a first location on the ground surface and configured to detect a second distance between the inclination sensor and a second location on the ground surface that is spaced apart from the first location in the direction of travel of the agricultural work vehicle; and
   the controller is configured to calculate the local inclination based on the first distance and the second distance to detect the local inclination of the ground surface.

18. The system of claim 17, wherein the first location is located aft of a leading edge of the implement with respect to the direction of travel.

19. The system of claim 17, wherein the second location is spaced apart from the first location in the direction of travel of the agricultural work vehicle by a distance that is less than half of a width of the implement in a lateral direction that is perpendicular to the direction of travel of the agricultural work vehicle.

20. The system of claim 12, the local inclination of the ground surface is detected for a portion of the ground surface that is located below at least a portion of the implement.

* * * * *